United States Patent [19]
Johnson

[11] 3,762,298
[45] Oct. 2, 1973

[54] EXPOSURE COMPENSATION ARRANGEMENT FOR A VARIABLY FOCUSED POLARIZING SYSTEM

[75] Inventor: Bruce K. Johnson, Andover, Mass.
[73] Assignee: Polaroid Corporation, Cambridge, Mass.
[22] Filed: Apr. 24, 1972
[21] Appl. No.: 246,740

[52] U.S. Cl. .................... 95/44 R, 95/11 R, 95/45
[51] Int. Cl. ............................................. G03b 3/02
[58] Field of Search .................. 95/44 R, 44 C, 45, 95/11 R

[56] References Cited
UNITED STATES PATENTS

| 2,705,908 | 4/1955 | Walker | 95/45 |
| 2,618,209 | 11/1952 | Silent | 95/45 |
| 2,936,689 | 5/1960 | Kirchoff | 95/44 C |
| 3,118,360 | 1/1964 | Marjoram et al. | 95/45 |
| 3,224,351 | 12/1965 | Strasser | 95/45 |
| 3,590,713 | 7/1971 | Kirstein | 95/45 |

Primary Examiner—Samuel S. Matthews
Assistant Examiner—E. M. Bero
Attorney—William A. Danchuk et al.

[57] ABSTRACT

A variable exposure compensation arrangement for use with a photographic camera incorporating a follow-focus exposure control system. The compensation arrangement is employed when the camera is used in conjunction with two linear polarizers for alleviating specular reflections. In order to compensate for the absorption of light within each polarizer, the compensation arrangement induces the follow-focus system to permit more light to enter the camera, thereby counterbalancing the decrease in light by the polarizers. The compensation arrangement includes a housing attached to the camera in an overlying relationship with the objective lens, and a movable lens means mounted within the housing.

7 Claims, 3 Drawing Figures

PATENTED OCT 2 1973 3,762,298

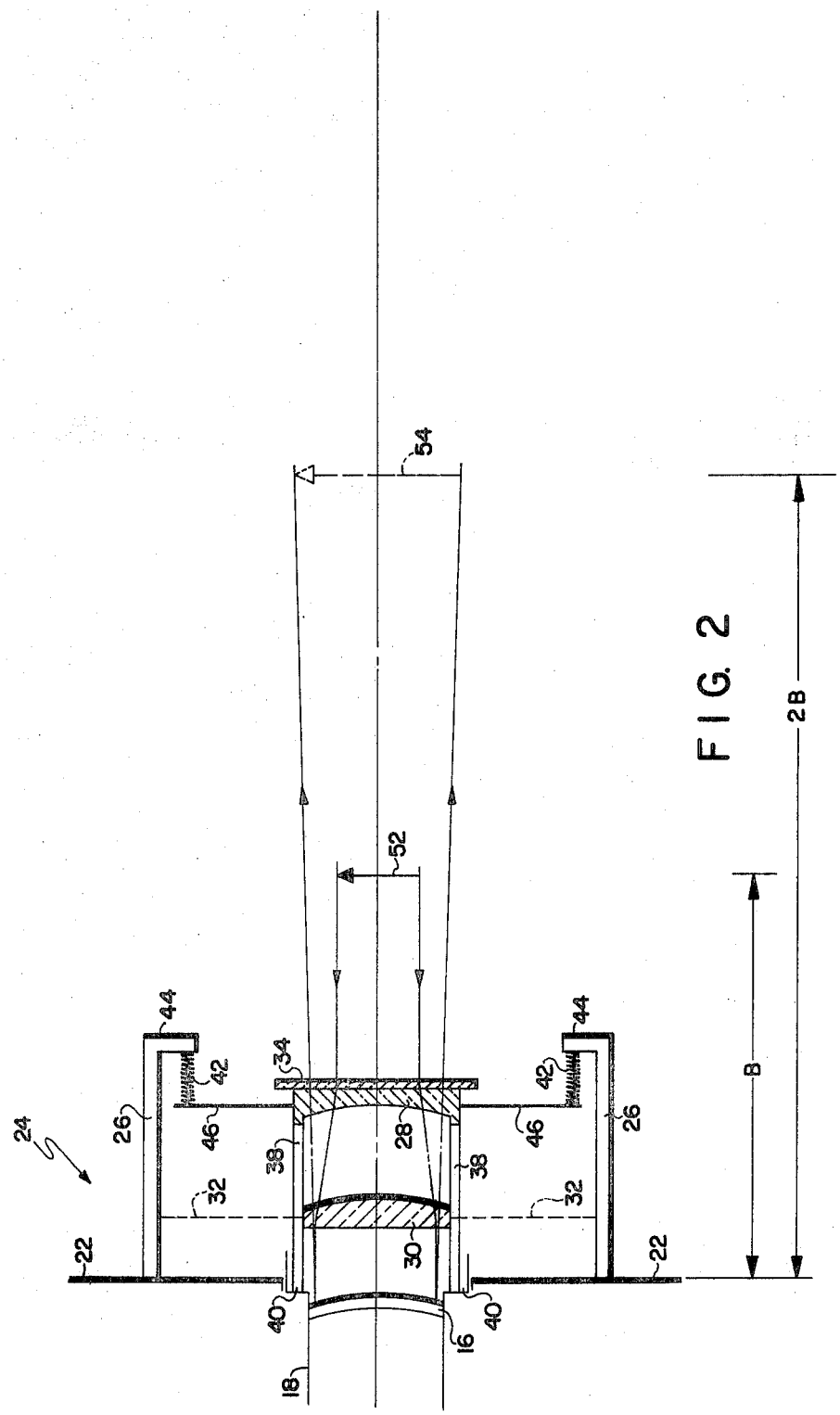

EXPOSURE COMPENSATION ARRANGEMENT FOR A VARIABLY FOCUSED POLARIZING SYSTEM

BACKGROUND

A series of photographic cameras have been developed which incorporate a follow-focus exposure system. A follow-focus system of this type is shown and described in a copending application for United States Patent entitled "Apparatus and System for Flash Photography", Ser. No. 168,671, by Lawrence M. Douglas, filed Aug. 3, 1971, and assigned to the assignee of the present application.

For photographic reasons, it has been found desirable in various circumstances to employ a polarizer with many photographic cameras. Polarizers have been employed for minimizing specular reflections from an object to be photographed. Their use with cameras of the follow-focus variety, however, is hampered by the fact that the polarizer absorbs approximately one-half of the light which passes through it. This decrease in the light level is not easily fed into the follow-focus system in a conventional manner. Moreover, if a flash system is used, it is desirable to incorporate a polarizer with the flash in order to further reduce specular reflections. Accordingly, the light entering the camera lens has been decreased by a factor of four. Since the follow-focus system depends primarily upon object distance, it should be apparent that the camera's aperture (set by the follow-focus system) will be two stops smaller than necessary for a well exposed picture.

SUMMARY OF THE INVENTION

The present invention is addressed to a compensation arrangement for use in conjunction with a camera incorporating a follow-focus system and which further incorporates a series of two polarizers for alleviating specular reflections. One polarizer is mounted in front of the camera's flash and other in front of the camera's objective lens. In order to compensate for the resultant decrease in light, a variable focal length doublet lens arrangement is mounted in front of the camera's objective lens. Basically formed as a converging lens, the doublet, in combination with the objective lens, produces a virtual image of the object at twice the object distance from the camera's lens. Accordingly, as the camera now sees the virtual object distance at twice the real object distance the camera's follow-focus system opens the camera's aperture by two stops. This two-stop increase result in four times as much light as is necessary under normal circumstances, thereby compensating for the two-stop decrease in light from the two polarizers.

It is therefore one object and feature of the present invention to provide a compensation arrangement for a camera incorporating a follow-focus exposure control system which is used in conjunction with a double polarizer for minimizing specular reflections.

It is another object and feature of the present invention to provide a variable focal length lens arrangement which compensates for a decrease in light levels due to absorption in polarizing elements when used in combination with a camera using a follow-focus exposure control system.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS:

FIG. 2 is a schematic representation of the present invention shown at one of its operative positions.

Figure 1:
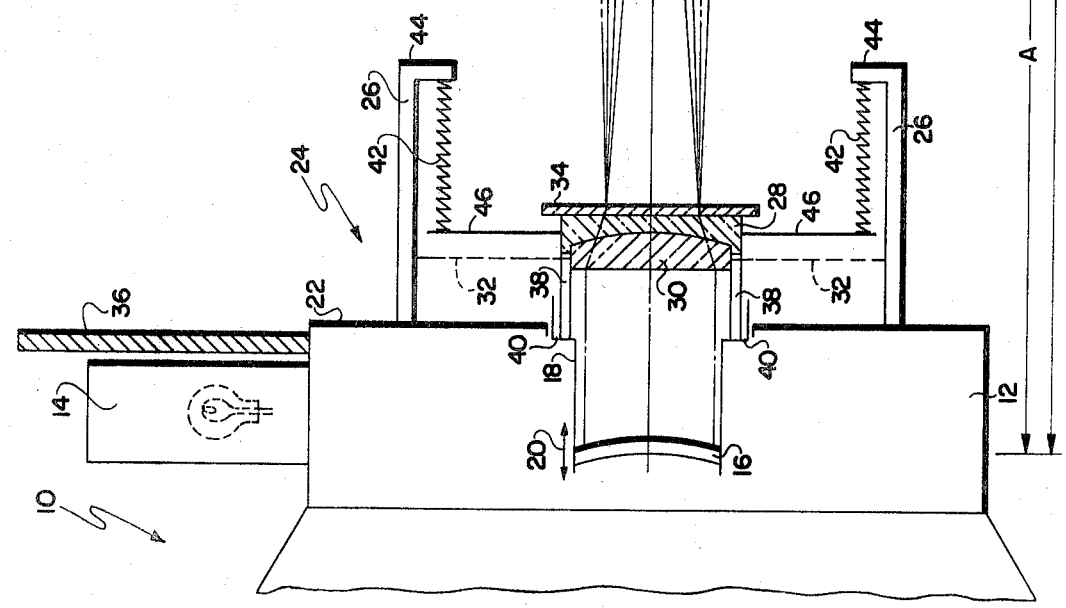
FIG. 1 is a schematic representation of the present invention taken in conjunction with a photographic camera having a follow-focus exposure control system.

DETAILED DESCRIPTION OF THE DRAWINGS:

Referring to FIG. 1, there is shown a camera 10 with which the present invention is incorporated. Camera 10 includes an exposure control housing 12 and a source of a flash illumination 14 mounted thereto. Mounted within housing 12 is an objective lens 16 and a mounting tube 18. Focusing is achieved by moving tube 18 in or out by a suitable arrangement (not shown) in the directions indicated by arrow 20.

Mounted on a front portion 22 of camera 10 is a compensating arrangement 24. The arrangement 24 may be attached to the front of camera 10 by any suitable mechanism, e.g. by clips. The compensating arrangement 24 includes a housing 26, a negative lens element 28 and a positive lens element 30. Lens elements 28 and 30 are mounted within arrangment 24 such that their optical axes are aligned with the optical axis of the objective lens 16. Positive lens 30 is mounted to housing 26 by suitable means, as shown by dashed lines 32, and does not move. Mounted to the front of negative lens element 28 is a polarizing element 34. Polarizing element 34 is operative to linearly polarize light and is oriented at a 90° angle with respect to a second polarizing element 36 mounted in front of the source of flash illumination 14. Both polarizing element 34 and negative lens element 28 are movably mounted within housing 26. Attached to the rearward outward edge of lens element 28 are a plurality of rods 38 which extend between negative lens element 28 and a lipped portion 40 of mounting tube 18. Rods 38 cooperate with the lipped portion of tube 18 to move lens element 28 and polarizing element 34 in response to the focusing movement of tube 18 and objective lens 16. Accordingly, as tube 18 is moved forwardly for close focusing purposes, rods 38 are operative to move lens element 28 and polarizing element 34 outwardly. This position is best shown in FIG. 2.

In order to provide for a bidirectional movement of lens element 28 and polarizing element 34, a spring biasing arrangement is provided. A plurality of coiled springs 42 are located at the front portion of housing 26. Springs 42 extend between a lip 44, formed at the front part of housing 26, to a ring 46 fixedly attached about the periphery of negative lens element 28. Configured as such, both lens element 28 and polarizing element 34 are movable away from positive lens element 30 through the cooperation between rods 38 and lip portion 40 of tube 18. Additionally, lens element 28 and polarizing element 34 are movable in the opposite direction by spring elements 42 in order to return both element 28 and 34 to their positions adjacent positive lens element 30.

Looking to FIG. 1, compensating arrangement 24 is shown a position in which an object 48 is placed a relatively large distance (approximately six feet) from objective lens 16. Object 48 is placed a distance A from objective lens 16. Due to the diverging effect of negative lens element 28 and the converging effect of positive lens element 30, a virtual image 50 is formed at a distance 2A from objective lens 16. It should be obvious to those skilled in the art that virtual image 50, in addition to being placed a distance 2A from objective lens 16, is also twice the size of the real object 48.

With the virtual image 50 placed a distance 2A away from the objective lens 16, the follow-focus system incorporated within camera 10, for use in conjunction with the source of flash illumination 14, will compensate accordingly (due to its dependency upon the inverse square law) and open the aperture (not shown) of camera 10 two stops, thereby allowing four times as much light to enter objective lens 16. This extra light, however, is absorped by polarizing elements 34 and 36. Light emanating from flash illumination source 14 is reduced by 50 percent due to the absorption qualities of polarizing element 36. Additionally, light entering camera 10 is reduced by 50 percent again due to the absorption qualities of polarizing element 34. As a result, the follow-focus system of camera 10 is "fooled" into allowing four times as much light as is necessary for normal exposure, thereby compensating for the 50 percent reduction in light by each of polarizing elements 34 and 36.

Looking to FIG. 2, compensating arrangement 24 is shown in a position in which it is capable of focusing a relatively close object. An object 52 is placed a distance B from objective lens 16. As object 52 is placed close to camera 10 (at approximately 5 inches) objective lens 16 and tube 18 are moved to the front portion of camera 10 in order to correctly focus object 52. As tube 18 is moved forwardly, lipped portion 40 is operative to move lens 28 and polarizing element 34 outwardly through rods 38. As may be evidenced from the accompanying ray diagram, a virtual image 54 is produced at a distance 2B away from objective lens 16. Virtual image 54 is twice the size of object 52. In a fashion similar to that described in conjunction with FIG. 1, the follow-focus system incorporated within a camera 10 sees a virtual image 54 at a distance twice that of the object distance B. Accordingly, the aperture of camera 10 is opened by two stops, thereby compensating for the 50 percent absorption of light at both polarizing elements 34 and 36.

Although only two positions of the compensation arrangement 24 have been shown, it should be obvious that the arrangement is variable and may be used for object distances between 5 inches and 6 feet. These limits are primarily a function of the focusing limitations inherent with camera 10. Specifically, camera 10 may only be focused between 10 inches and infinity. An object placed at five inches will be focused by the camera lens 16 as if it were at 10 inches (due to the virtual image produced by arrangement 24). Accordingly, a lower limit at which arrangement 24 may be used is defined by an object distance of 5 inches. The upper limit of use, however, is not limited by focusing considerations, but by the follow-focus system. The follow-focus exposure control system incorporated within camera 10 is operative to provide a fully opened aperture between the focused object distances of 12 feet to infinity. As a result, a virtual image placed at 12 feet from objective lens 16 results in a fully opened aperture. Since no further opening may be effected, the real object distance must be less than 6 feet. For a fuller understanding of the follow-focus exposure control system and its operation, reference should be made to a copending application for U.S. patent entitled "Apparatus and System for Flash Photography", Ser. No. 168,671, by Lawrence M. Douglas, filed Aug. 3, 1971, and assigned to the assignee of the present application.

The arrangement 24 has an additional advantage in minimizing spherical aberrations inherent in lenses 28 and 30. Specifically, lenses 28 and 30 may be considered as a single piece of optical glass when the object distance is at about 6 feet (see FIG. 1). This situation results in a fully opened aperture. The possibility of undesirable spherical aberrations is minimized, however, by the fact that a single piece of optical glass has minimum spherical aberrations. However, as the lenses are separated, for focusing a close object, there results an increase in aberrations. These aberrations are counteracted by a relatively small aperture for small objective distances. As a result, spherical aberrations at both large and small object distances are effectively eliminated.

Figure 3:
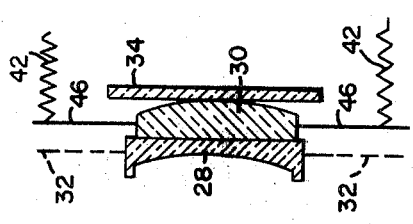
FIG. 3 is a schematic representation of a second embodiment of the present invention.

It should become apparent to those skilled in the art, that lenses 28 and 30 may be reversed in their positions and mobility with the same results as discussed above. In such a case, positive lens 30 would be mounted in front of negative lens 28 and lens 30 would be movable in response to the focusing of camera lens 16 (See FIG. 3).

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An exposure compensation apparatus for use with a photographic camera having an objective lens for focusing an image to be photographed, a shutter, a source of artificial illumination, and incorporating a follow-focus exposure control system, said exposure compensation apparatus comprising:
   a housing, attachable to a portion of said photographic camera in overlying relationship with said objective lens of said photographic camera;
   light reducing means for reducing the level of light entering said objective lens of said camera, said light reducing means being positioned within said housing in covering relationship in front of said objective lens of said camera; and
   lens means, movably mounted within said housing in optical covering relationship with said objective lens of said photographic camera, for producing an artificial focus condition within said objective lens and said follow-focus exposure control system for causing said follow-focus exposure control system to compensate for said reduced light level entering said objective lens.

2. The exposure compensation apparatus according to claim 1 in which said exposure compensation apparatus further includes means for varying said lens means with respect to said objective lens of said photographic camera.

3. The exposure compensation apparatus according to claim 1 in which said light reducing means for reducing said level of light entering said objective lens is a polarizing member.

4. The exposure compensation apparatus according to claim 3 in which a polarizing member is positioned in covering relationship with said objective lens and another polarizing member is positioned in front of said source of artificial illumination, said exposure compensation apparatus being operative to induce said follow-focus exposure control system to compensate for lower light levels due to light absorption within said polarizing members.

5. The exposure compensation apparatus according to claim 3 in which said exposure compensation apparatus includes a variable focal length doublet lens, said doublet lens being operative to form a virtual image of an object to be photographed at a distance approximately twice the object distance, said follow-focus exposure control system thereby being induced to allow more light to enter said camera than is necessary for an object placed at said objective distance.

6. The exposure compensation apparatus according to claim 5 in which said variable focal length doublet lens includes a positive converging lens element and a negative diverging lens element, said positive converging lens element being mounted within said housing a given distance from said objective lens and said negative diverging lens element being movably mounted within said housing, said negative diverging lens element being movable with respect to said positive converging lens element in response to movement of said objective lens when said camera is focused.

7. The exposure compensation apparatus according to claim 5 in which said variable focal length doublet lens includes a negative diverging lens element and a positive converging lens element, said negative diverging lens element being mounted within said housing a given distance from said objective lens and said positive converging lens element being movably mounted within said housing, said positive converging lens element being movable with respect to said negative diverging lens element in response to movement of said objective lens when said camera is focused.

* * * * *